United States Patent
Oda et al.

(10) Patent No.: US 6,591,172 B2
(45) Date of Patent: Jul. 8, 2003

(54) AUTOMATIC VEHICLE GUIDANCE SYSTEM, CONTROL APPARATUS IN AUTOMATIC VEHICLE GUIDANCE SYSTEM, AUTOMATIC VEHICLE GUIDANCE METHOD, AND COMPUTER-READABLE DATA RECORDED MEDIUM IN WHICH AUTOMATIC VEHICLE GUIDANCE SYSTEM PROGRAM IS RECORDED

(75) Inventors: Tamami Oda, Tsurugashima (JP); Tomo Watanabe, Tsurugashima (JP); Tsuyoshi Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/279,818

(22) Filed: Oct. 25, 2002

(65) Prior Publication Data

US 2003/0088344 A1 May 8, 2003

(30) Foreign Application Priority Data

Nov. 2, 2001 (JP) ......................... 2001-337629

(51) Int. Cl.[7] ............................................... G05B 1/00
(52) U.S. Cl. ........................... 701/23; 701/24; 701/202; 701/208
(58) Field of Search ............................ 701/23, 24, 25, 701/26, 202, 207, 201, 200, 208, 209, 213; 340/988, 990–995; 342/357.01, 357.06, 357.08, 357.12, 357.13

(56) References Cited

U.S. PATENT DOCUMENTS 6,421,590 B2 * 7/2002 Thibault ..................... 701/24
6,466,865 B1 * 10/2002 Petzold ....................... 701/202
6,484,092 B2 * 11/2002 Seibel ......................... 701/24
6,498,983 B2 * 12/2002 Hashida ..................... 701/207

FOREIGN PATENT DOCUMENTS

JP       A7073396     * 3/1995
JP       2000-276690     10/2000

* cited by examiner

Primary Examiner—Richard M. Camby
(74) Attorney, Agent, or Firm—Sughrue Mion, PLLC

(57) ABSTRACT

An automatic guidance system is comprised of a navigation apparatus mounted on a vehicle and a control server apparatus fixedly installed in an automatic travel control center which controls traveling in an automatic traveling section. The control server apparatus and the navigation apparatus establish a communication line through a mobile communication network. The navigation apparatus makes a search for a route to a destination. If at least part of the automatic traveling section is used in a route set by the search, the automatic traveling section is registered in the control server apparatus through the communication line.

24 Claims, 9 Drawing Sheets

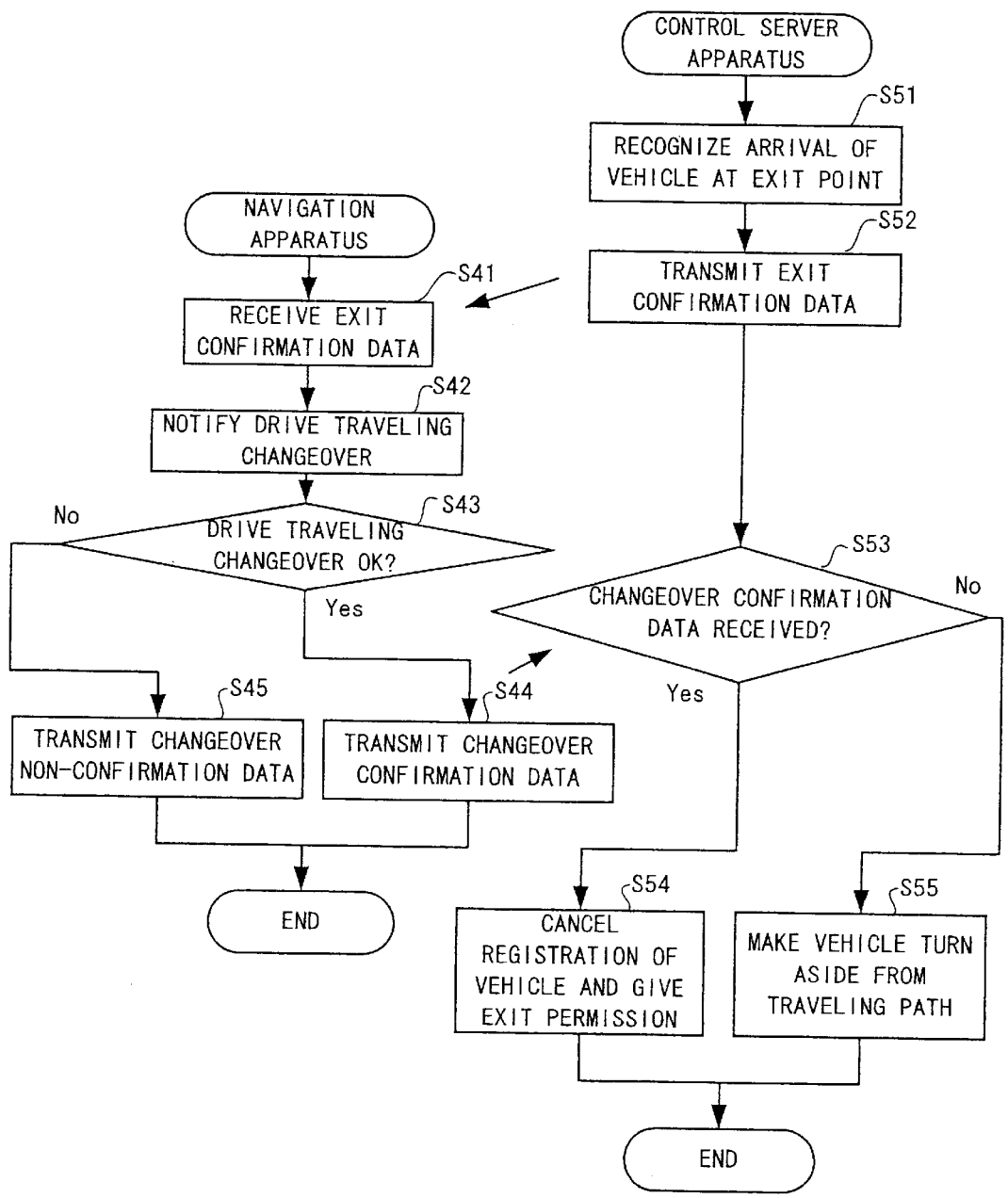

PRESS ENTER KEY
NORMAL TRAVELING
IS SELECTED

NORMAL TRAVELING
WILL BE STARTED

YOU MUST BE ASLEEP
VEHICLE WILL BE GUIDED
TO AREA FOR CHANGEOVER
TO NORMAL TRAVELING

AUTOMATIC VEHICLE GUIDANCE SYSTEM, CONTROL APPARATUS IN AUTOMATIC VEHICLE GUIDANCE SYSTEM, AUTOMATIC VEHICLE GUIDANCE METHOD, AND COMPUTER-READABLE DATA RECORDED MEDIUM IN WHICH AUTOMATIC VEHICLE GUIDANCE SYSTEM PROGRAM IS RECORDED

BACKGROUND OF THE INVENTION

1. Field of the Invention

The present invention relates to techniques for automatic-drive traveling of a vehicle in techniques relating to intelligent transport systems (ITS) and, more particularly, to a technique for registering an automatic traveling route for a vehicle by using a navigation system.

2. Description of the Related Art

In recent years, techniques have been realized which relate to intelligent transport systems (ITS) in which automatic toll payment and collection operations (in an automatic toll collection system) are performed by transmitting and receiving data between a vehicle and apparatuses installed on roads by mobile communication system. Studies of other techniques relating to ITS, i.e., techniques for support to careful driving, optimization of traffic control, etc. have also been advanced. In particular, studies of a kind of automatic guidance system relating to automatic traveling are being advanced by experiments based on traveling of actual vehicles. In the automatic guidance system, a driver does not perform driving operations but traveling of a vehicle such as a automobile in which the driver is riding is controlled in guiding the traveling vehicle.

For realization of such an automatic guidance system, building of infrastructures including roads is required as well as providing special-purpose equipment in vehicles. Possible forms of roads on which automatic traveling is performed include one in which particular travel paths are set as automatic traveling sections in which only vehicles capable of complete automatic traveling can be made to travel, and one in which an automatic traveling section and a non-automatic traveling section in which vehicles travel ordinarily by being operated by drivers are set in parallel with each other. That is, even if an automatic guidance system is realized, automatic traveling of all vehicles in operation is not possible at an initial stage of implementation of the system or automatic traveling cannot be performed on some roads, and conventional sections in which vehicles are manually driven by drivers and vehicles driven by drivers in the conventional manner coexist. For this reason, the above-described forms of roads are conceivable.

Therefore, techniques for changeover between automatic traveling and non-automatic traveling are considered particularly important among techniques for realizing automatic traveling at an initial stage of implementation of an automatic guidance system. Techniques for changeover between automatic traveling and non-automatic traveling are known, which include a typical automatic operation control apparatus disclosed in Japanese Patent Laid-Open Publication No. 2000-276690.

The conventional automatic operation control apparatus, however, requires a driver's operation for changing the vehicle traveling mode from the automatic-drive traveling mode to the normal-drive traveling mode during automatic-drive traveling. If the driver misses a point at which changeover from automatic-drive traveling to normal-drive traveling should be made, there is a possibility that the vehicle cannot travel the route on which the vehicle should travel.

Also, it is thought that in the case where a driver previously sets points at which the vehicle traveling mode should be changed from automatic-drive traveling to normal-drive traveling, troublesome operations for setting of an exit point etc. are required.

SUMMARY OF THE INVENTION

An object of the present invention is to provide an automatic vehicle guidance system in which an automatic traveling section in which a vehicle travels can be easily registered by using the results of a route search performed by navigation when the vehicle travels in the automatic traveling section.

The above object of present invention can be achieved by an automatic vehicle guidance system of the present invention. The automatic vehicle system for guiding a vehicle which travels in an automatic traveling manner without being operated by a driver in an automatic traveling section which is an automatic traveling path is provided with: a control device for managing the automatic traveling section, and controlling the vehicle traveling in the automatic traveling section; an acquisition device for obtaining present position data indicating the present position of the vehicle, and destination data indicating a destination to be reached by the vehicle; a route search device for making a search for a travel route to the destination on the basis of the present position data and the destination data relating to the vehicle; and a registration device for registering the automatic traveling path which is included in the travel route if at least part of the automatic traveling section is included in the travel route as a result of the route search, and the control device controls automatic traveling of the vehicle along the registered automatic traveling path to perform automatic guidance of the vehicle.

According to the present invention, if at least part of the automatic traveling section is used as a travel route as a result of the route search for a travel route to the destination which is to be reached by the vehicle, the automatic traveling path to be used is registered and automatic traveling of the vehicle is controlled by a control apparatus along the automatic traveling path when the vehicle travels in the automatic traveling section, thereby performing automatic guidance of the vehicle.

Accordingly, in the case where at least part of the automatic traveling section is included in the traveling route for the vehicle, the automatic traveling path for automatic traveling of the vehicle can be registered without any troublesome operation at the time of entry into the automatic traveling section or exit from the automatic traveling section. Therefore, the operability for the user can be improved and improved user support can be ensured.

Since the result of the search for the route to the destination is used at the time of setting of the automatic traveling path, the automatic traveling path can be registered with reliability.

In one aspect of the present invention, the automatic vehicle guidance system is further provided with: a re-search device for making at least a re-search for a travel route for the vehicle on the basis of the destination data while the vehicle is traveling in the automatic traveling section, and if a travel route to the destination is set by the re-search while the vehicle is traveling in the automatic traveling section, the registration device reregisters the automatic traveling path on the basis of the travel route set by the re-search.

According to the present invention, if a travel route to the destination is set by the re-search while the vehicle is traveling in the automatic traveling section, the registration device reregisters the automatic traveling path on the basis of the travel route set by the re-search.

Accordingly, the automatic traveling path can be reregistered according to the re-search result, even if the section through which automatic traveling is performed is changed, for example, by exit point of the automatic traveling section is changed, as a result of a re-search, a change in registration can be easily made. Therefore, the operability for the user can be improved and improved user support can be ensured.

In one aspect of the present invention, the automatic vehicle guidance system is further provided with: when the registration device registers the automatic traveling path, it registers at least one of the identification data of the vehicle, entry point data indicating an entry point at which the vehicle enters the automatic traveling section, and exit point data indicating an exit point at which the vehicle exits from the automatic traveling section.

According to the present invention, when at least part of the automatic traveling section is used as a result of a search for a vehicle traveling route, at least one of the vehicle identification data, the entry point at which the vehicle enters the automatic traveling section, and the exit point at which the vehicle exits from the automatic traveling section is registered along with the automatic traveling path.

Accordingly, entry into the automatic traveling section and exit from the automatic traveling section when the vehicle travels in the automatic traveling section can be controlled with reliability.

Since each vehicle can be easily identified from the identification data, automatic traveling control can be correctly performed with respect to each vehicle, thus enabling management on the automatic traveling section to be performed smoothly.

In one aspect of the present invention, in a case where at least one of the entry point data and the exit point data is registered by the registration device, the automatic vehicle guidance system is further provided with: a receiving device for receiving arrival data indicating that the vehicle reaches at least one of the entry point and the exit point, and the control device controls at least one of starting and termination of automatic traveling of the vehicle on the basis of the arrival data.

According to the present invention, in a case where the controlled vehicle traveling in the automatic traveling section reaches the entry point or the exit point after the entry point data and the exit point data is registered by the registration device, if at least part of the automatic traveling section is included in the travel route as a result of the route search, the control device controls starting or termination of automatic traveling of the vehicle.

Accordingly, entry into the automatic traveling section and exit from the automatic traveling section when the vehicle travels in the automatic traveling section can be controlled with reliability, thus enabling management on the automatic traveling section to be performed smoothly.

In one aspect of the present invention, in a case where at least one of the entry point data and the exit point data is registered by the registration device the automatic vehicle guidance system is further provided with: a detection device for detecting at least one of changeover of the traveling mode from the automatic traveling to normal-drive traveling based on manual operations, and changeover of the traveling mode from the normal-drive traveling to the automatic traveling, and the control device controls at least one of starting and termination of automatic traveling of the vehicle when the detection device detects at least one of changeover of the traveling mode at the entry point, and changeover of the traveling mode at the exit point.

According to the present invention, starting or termination of automatic traveling is controlled when changeover of the traveling mode at the entry point or the exit point is detected.

Accordingly, if changeover of the traveling mode is detected when the vehicle enters the automatic traveling section or exits from the automatic traveling section, automatic traveling can be started or terminated. For example, if the traveling mode is not changed to normal-drive traveling after the completion of traveling through the automatic traveling section, the vehicle is not allowed to enter a normal-drive traveling path but made to turn aside into a parking area or the like. Thus, safety of the vehicle traveling in both automatic and non-automatic traveling sections can be ensured without requiring any troublesome operation.

In one aspect of the present invention, the automatic vehicle guidance system is further provided with: the detection device detects changeover of the traveling mode based on condition data of the driver who is operating the vehicle.

According to the present invention, it is possible to prevent the vehicle from exiting from the automatic traveling section into a non-automatic traveling section when the driver is unable to operate the vehicle, thus ensuring safety of the vehicle traveling in both automatic and non-automatic traveling sections.

In one aspect of the present invention, the automatic vehicle guidance system is further provided with: the condition data has bodily data indicating condition which is included at least one of an awake condition and an asleep condition of driver, and the detection device detects changeover of the traveling mode based on the bodily data.

According to the present invention, it is possible to prevent the vehicle from exiting from the automatic traveling section into a non-automatic traveling section when normal driving is not possible, thus ensuring safety of the vehicle traveling in both automatic and non-automatic traveling sections.

In one aspect of the present invention, the automatic vehicle guidance system is further provided with: the automatic traveling path registered by the registration device is previously registered before the vehicle enters the automatic traveling section.

According to the present invention, an automatic traveling path is set in advance before the vehicle enters the automatic traveling section, thereby enabling the vehicle to smoothly enter the automatic traveling section. In this manner, improved user support can be achieved.

In one aspect of the present invention, the automatic vehicle guidance system is further provided with: a navigation system for performing navigation of the vehicle, the navigation system is provided with the acquisition device and the route search device, and the registration device registers the automatic traveling path, which is included in the travel route as a result of the route search, by communicating with the navigation system.

According to the present invention, the navigation system obtains present position data and destination data of the vehicle, makes a route search, communicates with the registration device, and thereby registers an automatic traveling path through which the vehicle will travel in the automatic traveling section, thus enabling automatically guided traveling of the vehicle. In this case, some of navigation systems widely available can be used to construct the automatic guidance system.

In one aspect of the present invention, the automatic vehicle guidance system is further provided with: the navigation system comprises an data server device fixedly installed, and a communication terminal device mounted on the vehicle and communicating with the data server device through a mobile communication network, the communication terminal device and the data server device communicate with each other to perform navigation of the vehicle, the data server device and the registration device communicate with each other to register the automatic traveling path which is included in the travel route as a result of the route search, and the control device performs automatic guidance of the vehicle traveling in the automatic traveling section.

According to the present invention, the above-described automatic guidance system can also be realized by using such a communication navigation system in which navigation of a vehicle is performed by communication between an data server apparatus and a communication terminal device.

The above object of present invention can be achieved by a control apparatus for an automatic vehicle guidance system for guiding a vehicle which travels in an automatic traveling manner without being operated by a driver in an automatic traveling section which is an automatic traveling path of the present invention. The control apparatus is provided with: a control device for managing the automatic traveling section and controlling the vehicle traveling in the automatic traveling section; a route data acquisition device for obtaining route data indicating a travel route to destination to be reached by the vehicle as a result of route search based on present position data of the vehicle, and destination data indicating a destination to be reached by the vehicle; and a registration device for registering the automatic traveling path which is included in the travel route if at least part of the automatic traveling section is included in the travel route as a result of the route search, and the control device controls automatic traveling of the vehicle along the registered automatic traveling path to perform automatic guidance of the vehicle.

According to the present invention, if at least part of the automatic traveling section is used as a travel route as a result of the route search for a travel route to the destination which is to be reached by the vehicle, the automatic traveling path to be used is registered and automatic traveling of the vehicle is controlled by a control apparatus along the automatic traveling path when the vehicle travels in the automatic traveling section, thereby performing automatic guidance of the vehicle.

Accordingly, in the case where at least part of the automatic traveling section is included in the traveling route for the vehicle, the automatic traveling path for automatic traveling of the vehicle can be registered without any troublesome operation at the time of entry into the automatic traveling section or exit from the automatic traveling section. Therefore, the operability for the user can be improved and improved user support can be ensured.

Since the result of the search for the route to the destination is used at the time of setting of the automatic traveling path, the automatic traveling path can be registered with reliability.

In one aspect of the present invention, the control apparatus is further provided with: if a travel route to the destination is set by the re-search while the vehicle is traveling in the automatic traveling section, the registration device reregisters the automatic traveling path on the basis of the travel route set by the re-search.

According to the present invention, if a travel route to the destination is set by the re-search while the vehicle is traveling in the automatic traveling section, the registration device reregisters the automatic traveling path on the basis of the travel route set by the re-search.

Accordingly, the automatic traveling path can be reregistered according to the re-search result, even if the section through which automatic traveling is performed is changed, for example, by exit point of the automatic traveling section is changed, as a result of a re-search, a change in registration can be easily made. Therefore, the operability for the user can be improved and improved user support can be ensured.

In one aspect of the present invention, the control apparatus is further provided with: when the registration device registers the automatic traveling path, it registers at least one of the identification data of the vehicle, entry point data indicating an entry point at which the vehicle enters the automatic traveling section, and exit point data indicating an exit point at which the vehicle exits from the automatic traveling section.

According to the present invention, when at least part of the automatic traveling section is used as a result of a search for a vehicle traveling route, at least one of the vehicle identification data, the entry point at which the vehicle enters the automatic traveling section, and the exit point at which the vehicle exits from the automatic traveling section is registered along with the automatic traveling path.

Accordingly, entry into the automatic traveling section and exit from the automatic traveling section when the vehicle travels in the automatic traveling section can be controlled with reliability.

Since each vehicle can be easily identified from the identification data, automatic traveling control can be correctly performed with respect to each vehicle, thus enabling management on the automatic traveling section to be performed smoothly.

In one aspect of the present invention, in a case where at least one of the entry point data and the exit point data is registered by the registration device, the control apparatus is further provided with: a receiving device for receiving arrival data indicating that the vehicle reaches at least one of the entry point and the exit point, the control device controls at least one of starting and termination of automatic traveling of the vehicle on the basis of the arrival data.

According to the present invention, in a case where the controlled vehicle traveling in the automatic traveling section reaches the entry point or the exit point after the entry point data and the exit point data is registered by the registration device if at least part of the automatic traveling section is included in the travel route as a result of the route search, the control device controls starting or termination of automatic traveling of the vehicle.

Accordingly, entry into the automatic traveling section and exit from the automatic traveling section when the vehicle travels in the automatic traveling section can be controlled with reliability, thus enabling management on the automatic traveling section to be performed smoothly.

In one aspect of the present invention, in a case where at least one of the entry point data and the exit point data is registered by the registration device, the control apparatus is further provided with: a changeover data acquisition device obtains changeover data which includes at least one of data indicating changeover of the traveling mode from the automatic traveling to normal-drive traveling based on manual operations in the vehicle, and data indicating changeover of the traveling mode from the normal-drive traveling to the automatic traveling in the vehicle, the control device controls at least one of starting and termination of automatic traveling of the vehicle when the changeover data acquisition device obtains the changeover data.

According to the present invention, starting or termination of automatic traveling is controlled when changeover of the traveling mode at the entry point or the exit point is detected.

Accordingly, if changeover of the traveling mode is detected when the vehicle enters the automatic traveling section or exits from the automatic traveling section, automatic traveling can be started or terminated. For example, if the traveling mode is not changed to normal-drive traveling after the completion of traveling through the automatic traveling section, the vehicle is not allowed to enter a normal-drive traveling path but made to turn aside into a parking area or the like. Thus, safety of the vehicle traveling in both automatic and non-automatic traveling sections can be ensured without requiring any troublesome operation.

In one aspect of the present invention, the control apparatus is further provided with: the registration device registers the automatic traveling path previously before the vehicle enters the automatic traveling section.

According to the present invention, an automatic traveling path is set in advance before the vehicle enters the automatic traveling section, thereby enabling the vehicle to smoothly enter the automatic traveling section. In this manner, improved user support can be achieved.

The above object of present invention can be achieved by an automatic vehicle guidance method of the present invention. The automatic vehicle method, in which automatic guidance of a vehicle is performed by controlling traveling of the vehicle in an automatic traveling section which is a travel path on which the vehicle travels in an automatic traveling manner without being operated by a driver, is provided with: an acquisition process of obtaining present position data indicating the present position of the vehicle, and destination data indicating a destination to be reached by the vehicle; a route search process of making a search for a travel route to the destination on the basis of the present position data and the destination data relating to the vehicle; a registration process of registering the automatic traveling path which is included in the travel route if at least part of the automatic traveling section is included in the travel route as a result of the route search; and an automatic guidance process of controlling automatic traveling of the vehicle along the registered automatic traveling path to perform automatic guidance of the vehicle.

According to the present invention, if at least part of the automatic traveling section is used as a travel route as a result of the route search for a travel route to the destination which is to be reached by the vehicle, the automatic traveling path to be used is registered and automatic traveling of the vehicle is controlled along the automatic traveling path when the vehicle travels in the automatic traveling section, thereby performing automatic guidance of the vehicle.

Accordingly, in the case where at least part of the automatic traveling section is included in the traveling route for the vehicle, the automatic traveling path for automatic traveling of the vehicle can be registered without any troublesome operation at the time of entry into the automatic traveling section or exit from the automatic traveling section. Therefore, the operability for the user can be improved and improved user support can be ensured.

In one aspect of the present invention, the automatic vehicle guidance method is further provided with: a re-search process of making at least a re-search for a travel route for the vehicle on the basis of the destination data while the vehicle is traveling in the automatic traveling section, in the registration process, if a travel route to the destination is set by the re-search while the vehicle is traveling in the automatic traveling section, the automatic traveling path is reregistered on the basis of the travel route set by the re-search.

According to the present invention, if a travel route to the destination is set by the re-search while the vehicle is traveling in the automatic traveling section, the registration device reregisters the automatic traveling path on the basis of the travel route set by the re-search.

Accordingly, the automatic traveling path can be reregistered according to the re-search result, even if the section through which automatic traveling is performed is changed, for example, by exit point of the automatic traveling section is changed, as a result of a re-search, a change in registration can be easily made. Therefore, the operability for the user can be improved and improved user support can be ensured.

Since the result of the search for the route to the destination is used at the time of setting of the automatic traveling path, the automatic traveling path can be registered with reliability.

In one aspect of the present invention, the automatic vehicle guidance method is further provided with: in the registration process, when the automatic traveling path is registered, at least one of the identification data of the vehicle, entry point data indicating an entry point at which the vehicle enters the automatic traveling section, and exit point data indicating an exit point at which the vehicle exits from the automatic traveling section is registered.

According to the present invention, when at least part of the automatic traveling section is used as a result of a search for a vehicle traveling route, at least one of the vehicle identification data, the entry point at which the vehicle enters the automatic traveling section, and the exit point at which the vehicle exits from the automatic traveling section is registered along with the automatic traveling path.

Accordingly, entry into the automatic traveling section and exit from the automatic traveling section when the vehicle travels in the automatic traveling section can be controlled with reliability.

Since each vehicle can be easily identified from the identification data, automatic traveling control can be correctly performed with respect to each vehicle, thus enabling management on the automatic traveling section to be performed smoothly.

In one aspect of the present invention, the automatic vehicle guidance method is further provided with: the automatic traveling path registered in the registration process is previously registered before the vehicle enters the automatic traveling section.

According to the present invention, an automatic traveling path is set in advance before the vehicle enters the automatic traveling section, thereby enabling the vehicle to smoothly enter the automatic traveling section. In this manner, improved user support can be achieved.

The above object of present invention can be achieved by a data recorded medium of the present inversion automatic vehicle guidance system of the present invention wherein an automatic vehicle guidance program is recorded so as to be read by a computer, the computer included in an automatic vehicle guidance system for guiding a vehicle which travels in an automatic traveling manner without being operated by a driver in an automatic traveling section which is an automatic traveling path, the automatic vehicle guidance program causing the computer to function as: a control device manages the automatic traveling section and controls the vehicle traveling in the automatic traveling section; an acquisition device obtains present position data indicating the present position of the vehicle, and destination data indicating a destination to be reached by the vehicle; a route search device makes a search for a travel route to the destination on the basis of the present position data and the destination data relating to the vehicle; and a registration device registers the automatic traveling path which is included in the travel route if at least part of the automatic traveling section is included in the travel route as a result of the route search; and an automatic guidance device controls automatic traveling of the vehicle along the registered automatic traveling path to perform automatic guidance of the vehicle.

According to the present invention, if at least part of the automatic traveling section is used as a travel route as a result of the route search for a travel route to the destination which is to be reached by the vehicle, the automatic traveling path to be used is registered and automatic traveling of the vehicle is controlled by a control apparatus along the automatic traveling path when the vehicle travels in the automatic traveling section, thereby performing automatic guidance of the vehicle.

Accordingly, in the case where at least part of the automatic traveling section is included in the traveling route for the vehicle, the automatic traveling path for automatic traveling of the vehicle can be registered without any troublesome operation at the time of entry into the automatic traveling section or exit from the automatic traveling section. Therefore, the operability for the user can be improved and improved user support can be ensured.

Since the result of the search for the route to the destination is used at the time of setting of the automatic traveling path, the automatic traveling path can be registered with reliability.

In one aspect of the present invention, the automatic vehicle guidance program causing the computer to function as: a re-search device makes at least a re-search for a travel route for the vehicle on the basis of the destination data while the vehicle is traveling in the automatic traveling section; and the registration device reregisters the automatic traveling path on the basis of a travel route to the destination set by the re-search if the travel route is set by the re-search while the vehicle is traveling in the automatic traveling section.

According to the present invention, if a travel route to the destination is set by the re-search while the vehicle is traveling in the automatic traveling section, the registration device reregisters the automatic traveling path on the basis of the travel route set by the re-search.

Accordingly, the automatic traveling path can be reregistered according to the re-search result, even if the section through which automatic traveling is performed is changed, for example, by exit point of the automatic traveling section is changed, as a result of a re-search, a change in registration can be easily made. Therefore, the operability for the user can be improved and improved user support can be ensured.

In one aspect of the present invention, the automatic vehicle guidance program causing the computer to function as: when the registration device registers the automatic traveling path, it registers at least one of the identification data of the vehicle, entry point data indicating an entry point at which the vehicle enters the automatic traveling section, and exit point data indicating an exit point at which the vehicle exits from the automatic traveling section.

According to the present invention, when at least part of the automatic traveling section is used as a result of a search for a vehicle traveling route, at least one of the vehicle identification data, the entry point at which the vehicle enters the automatic traveling section, and the exit point at which the vehicle exits from the automatic traveling section is registered along with the automatic traveling path.

Accordingly, entry into the automatic traveling section and exit from the automatic traveling section when the vehicle travels in the automatic traveling section can be controlled with reliability.

Since each vehicle can be easily identified from the identification data, automatic traveling control can be correctly performed with respect to each vehicle, thus enabling management on the automatic traveling section to be performed smoothly.

In one aspect of the present invention, the automatic vehicle guidance program causing the computer to function as: the registration device registers the registered automatic traveling path previously before the vehicle enters the automatic traveling section.

According to the present invention, an automatic traveling path is set in advance before the vehicle enters the automatic traveling section, thereby enabling the vehicle to smoothly enter the automatic traveling section. In this manner, improved user support can be achieved.

BRIEF DESCRIPTION OF THE DRAWINGS

FIG. 5 is a flowchart showing operations of the navigation apparatus and the control server apparatus in cancellation processing in the embodiment of the present invention;

DETAILED DESCRIPTION OF THE PREFERRED EMBODIMENTS

Figure 1:
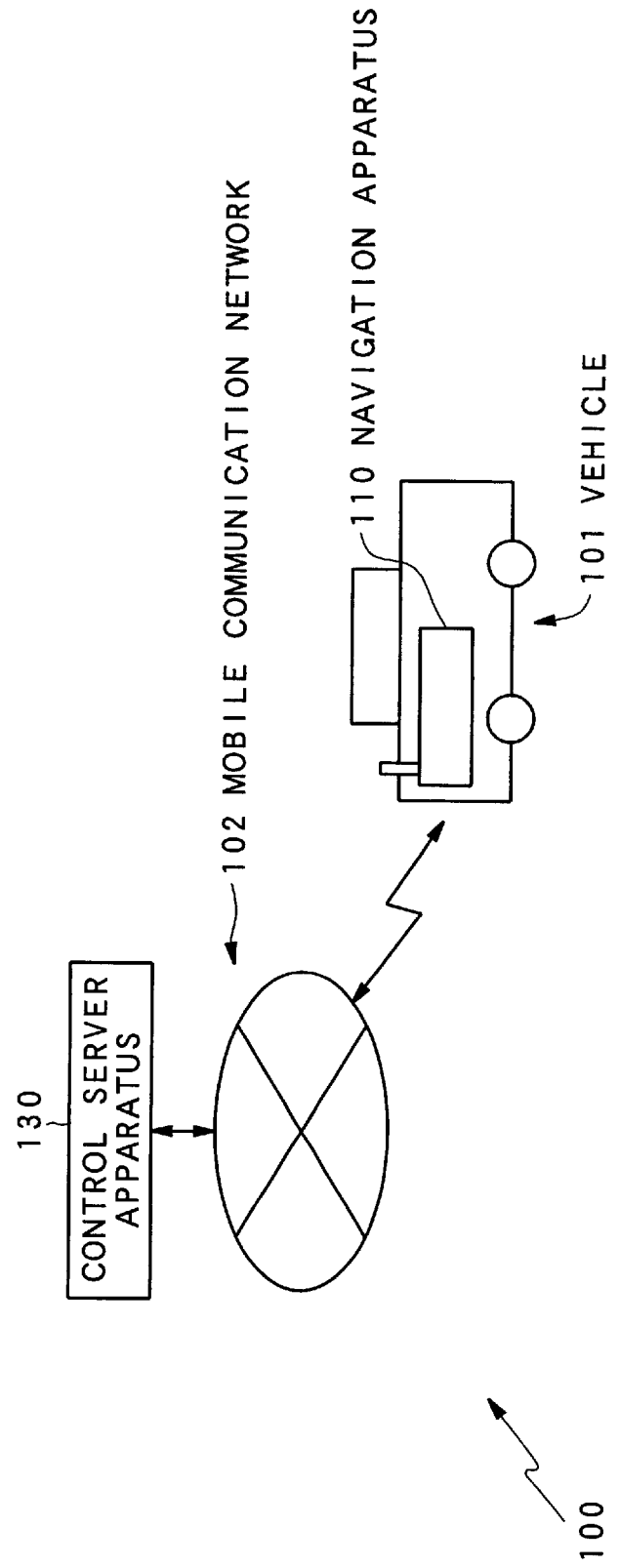
FIG. 1 is diagram schematically showing a configuration of an automatic guidance system in accordance with the present invention.

The present invention will now be described with reference to preferred embodiment shown in the drawings.

An embodiment of the present invention described below is an application of the present invention to an automatic vehicle guidance system which is provided for guidance along a particular automatic traveling section, and which is constituted by a navigation apparatus mounted on a vehicle and a control server apparatus provided in an automatic travel control center for control over the automatic traveling section.

I. Outline of Configuration and Operation

First, a configuration and an operation of a navigation system in this embodiment will be outlined with reference to FIG. 1.

FIG. 1 is a diagram schematically showing the configuration of an automatic guidance system in this embodiment.

As shown in FIG. 1, the automatic guidance system 100 of this embodiment is constituted by a navigation apparatus 110 mounted on a vehicle, 101, and a control server apparatus 130 provided as a stationary unit in an automatic travel control center for control over an automatic traveling section in which traveling of a vehicle is controlled with no driver's operation. The control server apparatus 130 and the navigation apparatus 110 have a communication line established therebetween through a mobile communication network 102 which includes a public telephone network line or an Internet.

In this automatic guidance system 100, a registration of the vehicle 101 and cancellation of the registration of the vehicle 101 with respect to traveling in the automatic traveling section are made by using data on the position of the vehicle 101 on which the navigation apparatus 110 is mounted (hereinafter referred to as "position data"), and data on a route to a destination to which the vehicle should travel (hereinafter referred to as "route data"). The position data and the route data are obtained by the navigation apparatus 110.

In ordinary cases, at the time of performing automatic control of traveling of vehicles (hereinafter referred to simply as "automatic travel control") in an automatic traveling section, it is necessary to make a registration of each of vehicles traveling in the automatic traveling section and to cancel the registration of each of the vehicles in order to perform smooth automatic travel control during traveling of the vehicle in the automatic traveling section, i.e., to perform entry control when each vehicle enters the automatic traveling section and exit control when the vehicle exits from the automatic traveling section, and to control traveling of the vehicle 101 according to a route in the automatic traveling section through which the vehicle should travel (hereinafter referred to as "automatic traveling section route").

In this embodiment, therefore, data about the vehicle 101, i.e., position data and route data obtained by the navigation apparatus 110 are transmitted to the control server apparatus 130, and a point at which the vehicle 101 enters the automatic traveling section (start point (hereinafter referred to simply as "entry point")), a point at which the vehicle 101 exits from the automatic traveling section (end point (hereinafter referred to simply as "exit point")), and the automatic traveling section route are computed in the control server apparatus 130 on the basis of the position data and the route data to make a registration of the vehicle 101 at the time of entry and cancellation of the registration at the time of exit.

More specifically, the navigation apparatus 110 makes a search for a route to a destination on the basis of data indicating the destination to be reached by the vehicle 101 on which the navigation apparatus 110 is mounted (hereinafter referred to as "destination data"), the vehicle position data obtained by receiving global positioning system (GPS) data, and mobile data, i.e., vehicle data obtained by various sensors, such as a vehicle speed sensor using vehicle speed pulses, an acceleration sensor, a vibration sensor, and a gyroscope. The navigation apparatus 110 performs navigation of the vehicle 101 by using a search result and these data. If the navigation apparatus 110 selects the automatic traveling section as a portion of a route to the destination as the route search result, it transmits the obtained position data and route data indicating the route search result to the control server apparatus 130 over the communication line when the vehicle reaches a point set in advance.

Furthermore, the control server apparatus 130 controls traveling of each of vehicles in the predetermined automatic traveling section (not shown), makes a registration of a vehicle entering the automatic traveling section, and cancels the registration of a vehicle exiting from the automatic traveling section. The control server apparatus 130 obtains the position data and the route data of the vehicle 101 on which the navigation apparatus 110 is mounted, and sets a point at which the vehicle enters the automatic traveling section, a point at which the vehicle exits from the automatic traveling section, and a route in the automatic traveling section through which the vehicle travels (hereinafter referred to as "automatic traveling route") on the basis of the position data and route data obtained.

In the thus-arranged system of this embodiment, when the automatic traveling section is selected to be used for traveling of the vehicle 101 as a result of a route search made by the navigation apparatus 110, a point (entry point) at which automatic traveling of the vehicle 101 in the automatic traveling section is started and a point (exit point) at which traveling of the vehicle 101 is terminated are determined to enable automatic travel control from the determined entry point to the determined exit point. This entry point and exit point setting can be easily made with reliability. Thus, the operability for the driver, i.e., the user, is improved and improved user support can be achieved.

II. Configuration of Each Apparatus

The configuration of each of the navigation apparatus 110 and the control server apparatus 130 will be described with reference to FIG. 2 and FIG. 3.

Figure 2:
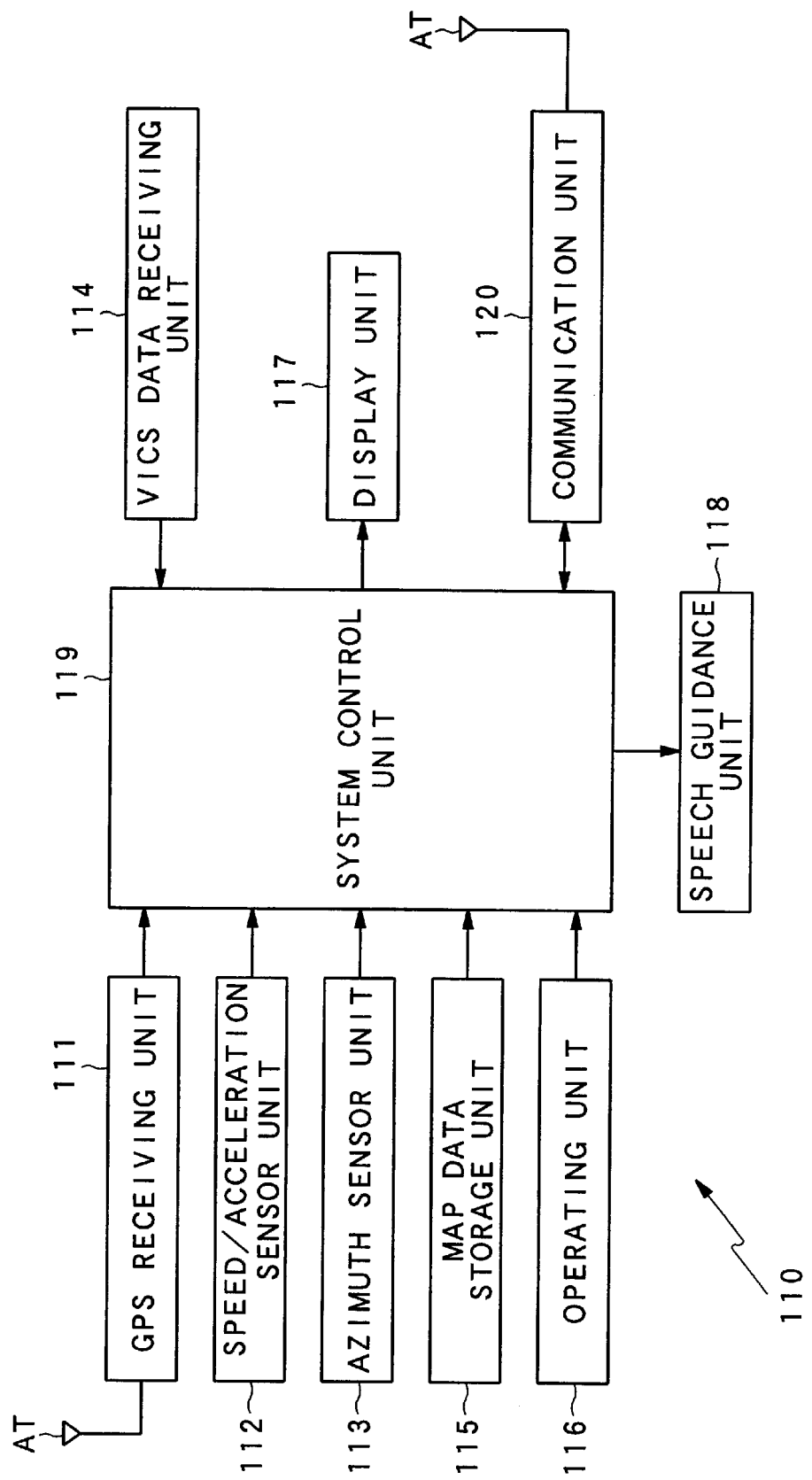
FIG. 2 is a block diagram showing a configuration of a navigation apparatus in an embodiment of the present invention.
Figure 3:
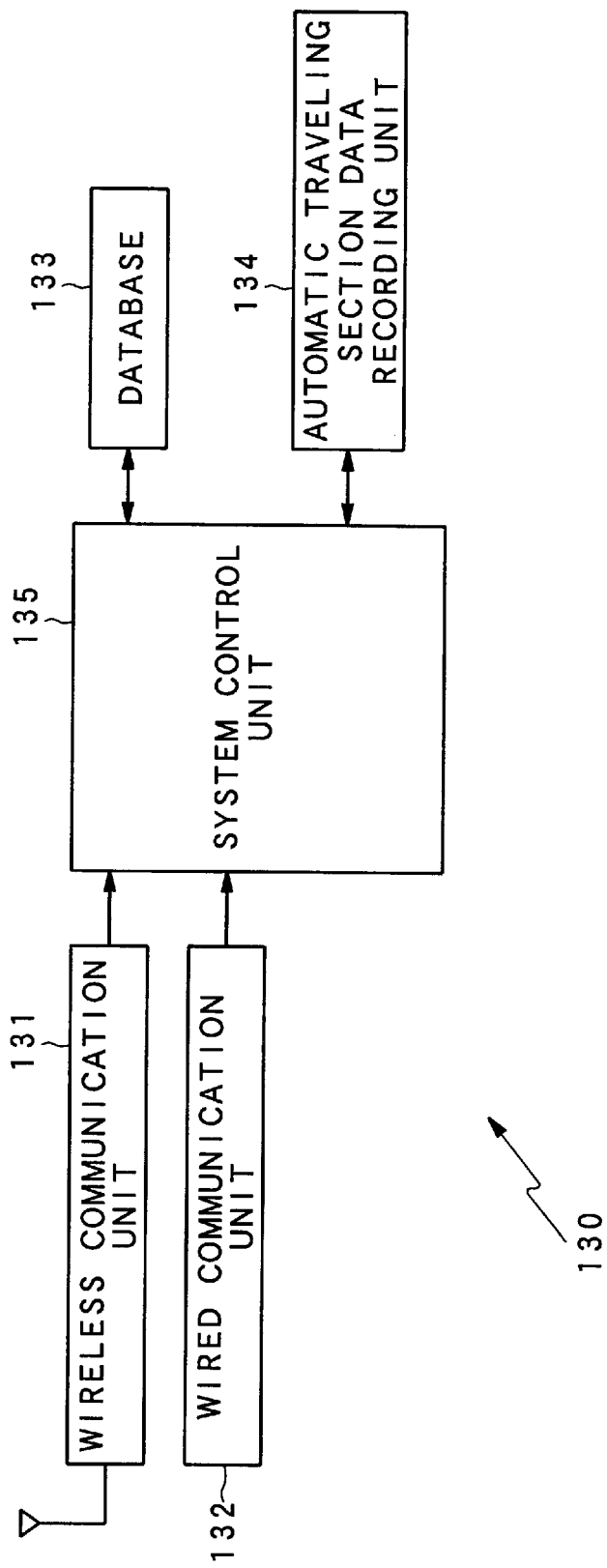
FIG. 3 is a block diagram showing a configuration of a control server apparatus in the embodiment of the present invention.

FIG. 2 is a block diagram showing a configuration of the navigation apparatus, and FIG. 3 is a block diagram showing a configuration of the control server apparatus.

First, the configuration of the navigation apparatus 110 will be described with reference to FIG. 2.

As shown in FIG. 2, the navigation apparatus 110 is constituted by a GPS receiving unit 111 which is connected to an antenna AT, and which receives GPS data, a speed/acceleration sensor unit 112 which detects the speed of traveling and acceleration of the vehicle, an azimuth sensor section 113 that senses the azimuth of the vehicle, a VICS data receiving unit 114 which receives VICS data from the vehicle information and communication system (VICS), a map data storage unit 115 in which map data is stored, an operating unit 116, a display unit 117 which displays map data and the position of the vehicle, a speech guidance unit 118 which outputs speeches for guidance, a system control unit 119 for overall control of the system, and a communication unit 120 which is connected to the antenna AT, and which performs communication with the control server apparatus 130.

The GPS receiving unit 111, the speed/acceleration sensor unit 112 and the azimuth sensor unit 113 are served as the acquisition device in accordance with the present invention. The system control unit 119 is served as the route search device and the re-search device in accordance with the present invention.

The GPS receiving unit 111 receives through the antenna AT navigation waves from a plurality of artificial satellites belonging to the GPS, computes pseudocoordinate values of the present position, and outputs the computed values as GPS data to the system control unit 119.

The speed/acceleration sensor unit 112 detects the speed of traveling of the vehicle, converts the detected speed into speed data pulse or in voltage form, and outputs the converted data to the system control unit 119.

Furthermore, the speed/acceleration sensor unit 112 compares the gravitational acceleration and the acceleration caused by movement of the vehicle to determine the state of movement of the vehicle in a vertical direction, converts acceleration data representing the detected state of movement into data in pulse or voltage form, and outputs the converted data to the system control unit 119.

The azimuth sensor unit 113 is constituted by a gyroscopic sensor. The azimuth sensor unit 113 detects the azimuth, i.e., the direction in which the vehicle is traveling, converts the detected azimuth into azimuth data in pulse or voltage form, and outputs the azimuth data to the system control unit 119.

The VICS data receiving unit 114 receives electric waves of an FM multiplexed broadcast or the like to obtain VICS data, and outputs the obtained VICS data to the system control unit 119.

The map data storage unit 115 stores, in a readable state, map data such as road maps and other sorts of data necessary for travel guidance. For example, the map data storage unit 115 is constituted by a DVD drive which reads out map data or the like from a DVD-read only memory (DVD-ROM) on which data necessary for travel guidance including the map data is stored, or a hard disk having map data etc. stored thereon.

The operating unit 116 is constituted by a remote controller or the like having a multiplicity of keys including various check buttons and numeric keys. For example, these keys are provided for the purpose of enabling the driver to input data on a destination, a vehicle traveling data display instruction, route search conditions, other instructions, etc.

The display unit 117 displays map data output from the map data storage unit 115, and data on various conditions including those relating to travel guidance performed by the navigation apparatus 110, and data on a destination.

The speech guidance unit 118 outputs, in speech form, travel route guidance data. The travel route guidance data include data on the vehicle traveling direction from the next intersection, and data to be notified directly to the driver in guidance (congestion data, road closure data, etc.).

The system control unit 119 has various input/output ports (e.g., a GPS receiving port, a key input port, and a display unit control port) and performs centralized control on general functions for navigation processing in parallel with the above-described operations.

The system control unit 119 controls display unit 117 etc. so that the above-described travel route guidance data is displayed on display unit 117 in a map on which the present position of the vehicle is shown in a peripheral area on the basis of traveling data (vehicle position and speed data) obtained by a position computation unit (not shown). The system control unit 119 also controls the speech guidance unit 118 etc. so that corresponding travel route guidance data or the like is output as a speech from the speech guidance unit 118.

The system control unit 119 performs navigation processing on the basis of a destination input through the operating unit 116 and obtained position data.

More specifically, the system control unit 119 searches the map data storage unit 115 on the basis of mobile data and navigation data received by the GPS receiving unit 111 to obtain predetermined data, and performs navigation processing including processing for search for a route to be traveled by the vehicle 101 on which the navigation apparatus 110 is mounted, and processing for guiding the vehicle 101 along the route. The system control unit 119 transmits a route search result, i.e., route data, to the control server apparatus 130 via the communication unit 120.

Further, when the system control unit 119 communicates with the control server apparatus 130, it transmits data for discrimination of the navigation vehicle from others (hereinafter referred to as "identification data"), e.g., a license number of the vehicle and a vehicle type to the control server apparatus 130 via the communication unit 120.

Further, the system control unit 119 is connected to a traveling mode changeover unit (not shown) which effects changeover between automatic traveling and normal-drive traveling controlled by the driver, and detects changeover between automatic traveling and normal-drive traveling. When the mode of traveling of the vehicle is changed from automatic traveling to normal-drive traveling or from normal-drive traveling to automatic traveling by the traveling mode changeover unit, the system control unit 119 transmits changeover data to the control server apparatus 130 via the communication unit 120 to inform the control server apparatus 130 that the traveling methods have been switched (condition data).

Specifically, in this embodiment, data on bodily conditions of the driver, e.g., condition of awaking and condition of sleep is detected when the traveling mode is changed from the automatic traveling mode to the normal driving mode. The traveling mode is changed after detecting such data.

For example, a microwave is emitted to the driver, and the driver's condition, i.e., condition of awaking or condition of sleep, is detected on the basis of bodily condition data represented by the reflected microwave from the driver's chest or abdomen.

More specifically, breathing of the driver's chest or abdomen and displacements of the skin or a blood vessel are measured by the reflected microwave, and driver's heartbeat conditions (changes in heart rate, a deviation from the average, variation in heartbeat cycle) are detected on the basis of the measured displacements. On the basis of the heartbeat conditions, driver's bodily fatigue is detected and a determination is made as to whether the driver is in condition of sleep.

The communication unit 120 communicates with the control server apparatus 130 through the mobile communication network 102. The communication unit 120 transmits position data, route data and identification data of the vehicle to the control server apparatus 130 through the mobile communication network 102.

The configuration of the control server apparatus 130 will next be described with reference to FIG. 3.

The control server apparatus 130 is constituted by a wireless communication unit 131 which communicates with the navigation apparatus 110, a wired communication unit 132 which receives data on vehicles 101 etc. in the automatic traveling section, a database 133 in which data on automatic traveling of each vehicle 101 is stored, an automatic traveling section data recording unit 134 in which data about the automatic traveling section is recorded, and a system control unit 135 which controls traveling on each vehicle 101 in the automatic traveling route and performs centralized control on automatic traveling.

The control server apparatus 130 is served as the control apparatus in accordance with the present invention, and the wireless communication unit 131 is served as the receiving device and the route data acquisition device in accordance with the present invention. The system control unit 135 is served as the registration device, the changeover data acquisition device and the automatic guidance device in accordance with the present invention.

The wireless communication unit 131 communicates with the navigation apparatus 110 through the mobile communication network 102. The wireless communication unit 131 receives position data, route data and identification data of vehicle 101 transmitted from the navigation apparatus 110 and outputs the received data to the system control unit 135.

The wired communication unit 132 receives data on traveling of each vehicle 101 in the automatic traveling section. Therefore, the control server apparatus 130 can keep track of each travel-controlled vehicle 101 in the automatic traveling section on the basis of this data.

For example, the wired communication unit 132 obtains data on vehicles 101 received by a plurality of beacon receiving units (not shown) placed in the automatic traveling section. The wired communication unit 132 monitors the speeds of the vehicles, the distances between the vehicles, and control on confluence and divergence of the vehicles traveling in the automatic traveling section on the basis of the received data on each vehicle 101.

Control on traveling of each vehicle 101 (automatic guidance) is performed on the basis of an entry point and an exit point described below, which are computed by communication between the system control unit 135 and the automatic traveling apparatus (not shown) of the vehicle 101.

In the database 133, data on vehicles 101 traveling in the automatic traveling section is stored. Data on each vehicle 101 includes identification data such as a vehicle type and a license number, route data, point data on an entry point and an exit point, and data of an automatic traveling route data from the entry point to the exit point.

The automatic traveling section data recording unit 134 are recorded point data on an entry point and an exit point in the automatic traveling section (if a plurality of entry points and plurality of exit points exist, all the entry and exit points), and data on the automatic traveling section, i.e., data on confluence points, divergence points, drive stop areas (parking areas), drive rest areas (service areas), etc. According to an instruction from the system control unit 135, the database 133 is searched for predetermined data, which is output to the system control unit 135.

The system control unit 135 is supplied with identification data and route data of each vehicle 101 transmitted from the navigation apparatus 110. The system control unit 135 sets an entry point and an exit point in the automatic traveling section with respect to each vehicle 101 on the basis of the position data and the route data, computes a travel route along which the vehicle will travel automatically, forms data on each vehicle 101, and outputs the data to the database 133.

When each vehicle 101 reaches the entry point, the system control unit 135 obtains the identification data of the vehicle 101, collates the identification data with data on the vehicle 101 in the database 133, and controls automatic traveling of the vehicle 101 through the automatic traveling apparatus (not shown) mounted on the vehicle 101 on the basis of the data on the vehicle 101.

Also, the system control unit 135 receives data transmitted from the vehicle 101 for a notification that the vehicle has arrived at the entry point (automatic traveling start confirmation data) or a notification that the vehicle has arrived at the exit point (automatic traveling end confirmation data). The system control unit 135 starts or terminates processing relating to automatic traveling of the vehicle 101 when each vehicle 101 reaches the entry point or the exit point in the automatic traveling section.

Identification check terminals (not shown) for identifiing vehicles 101 are placed in the automatic traveling section. Each identification check terminal is used for transmitting and receiving identification data between the system control unit 135 and each vehicle 101. When one vehicle 101 reaches an entry point, the system control unit 135 receives automatic traveling start confirmation data transmitted from the vehicle 101, collates with the database the identification data of the vehicle 101 detected by the identification check terminal, and instructs each unit to start processing for automatic traveling if the corresponding data has already been registered in the database 133. If there is no corresponding data registered in the database 133 after collating the identification data of the detected vehicle 101 with the database 133, the system control unit 135 registers the identification data of the detected vehicle 101 in database 133 through the operating unit 116 of the navigation apparatus 110. In this embodiment, similar processing is performed at the exit point for changeover from automatic traveling to normal-drive traveling.

III. Vehicle Registration Operation, Cancellation Operation, and Reregistration Operation (1) Operations in Registration Processing in the present embodiment The operation of the automatic vehicle guidance system 100 when registration processing is performed in this embodiment will be described with reference to FIG. 4.

Figure 4:
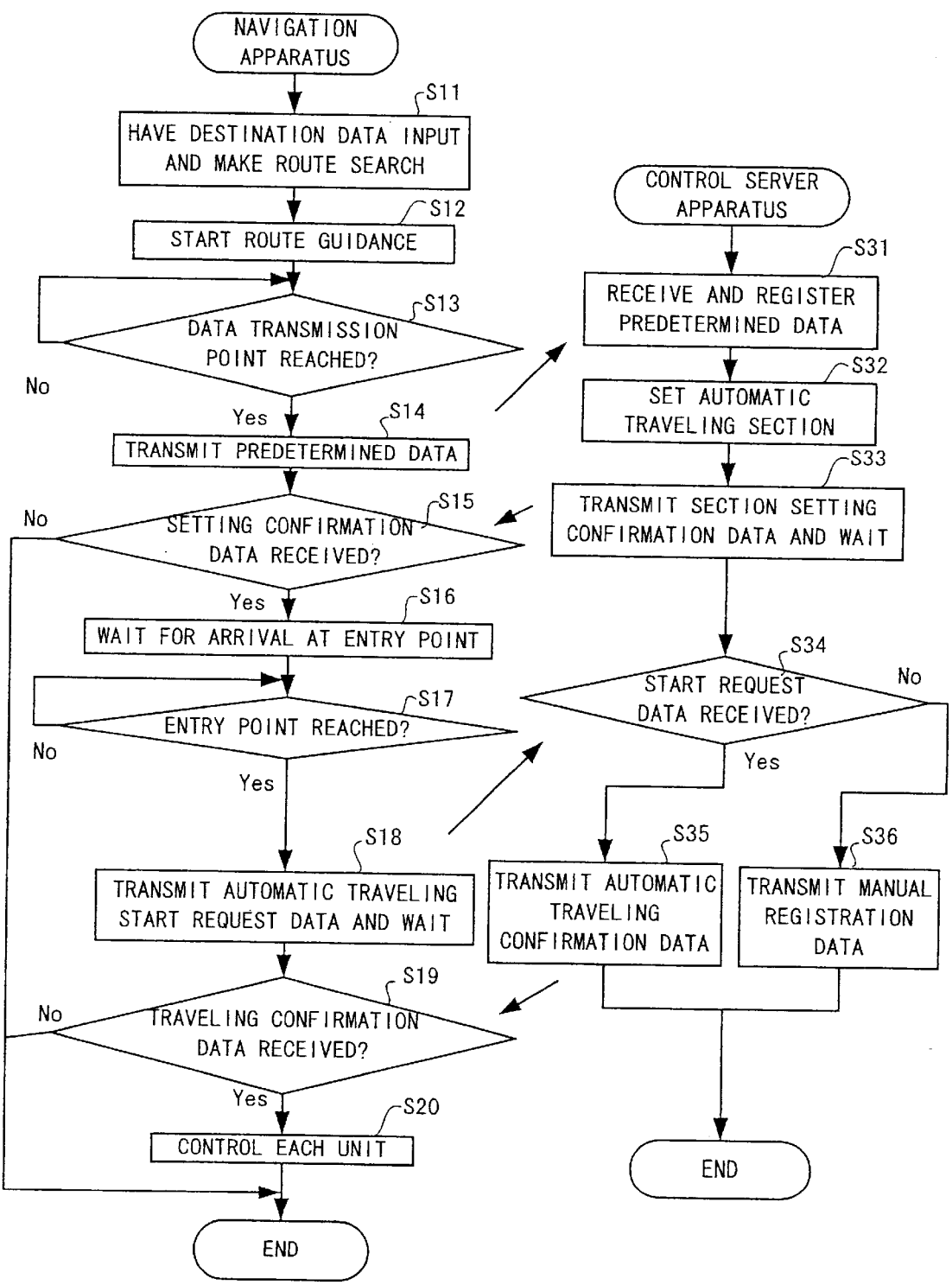
FIG. 4 is a flowchart showing operations of the navigation apparatus and the control server apparatus in registration processing in the embodiment of the present invention.

FIG. 4 is a flowchart showing the operations of the navigation apparatus 110 and the control server apparatus 130 when registration processing is performed. The operations will be described by assuming that the automatic traveling route is included in a guidance route determined by route search processing.

First and foremost, processing described below is performed in the navigation apparatus 110.

When a destination data is input through the operating unit 116 by a user, e.g., a driver, the system control unit 119 makes a route search (step S11), and the system control unit 119 starts route guidance (step S12). At this time, the system control unit 119 sets a point at which the distance between the position of the vehicle and the automatic traveling section is equal to a distance set in advance (hereinafter referred to as "registration data transmission point").

The system control unit 119 registers a registration data transmission point at a start of route guidance, and transmits route data etc. when the vehicle 101 reaches the registration data transmission point, as described below. Alternatively, route data etc. may be transmitted at a start of route guidance.

Subsequently, the system control unit 119 makes a determination in repeated cycles as to whether the vehicle 101 has reached the registration data transmission point (step S13). When the system control unit 119 determines that the vehicle has reached the point, it establishes a communication line to the control server apparatus 130 by the communication unit 120 and transmits route data and identification data to the control server apparatus 130 through the communication unit 120 (step S14).

Subsequently, processing described below is performed in the control server apparatus 130.

When the system control unit 135 receives route, data and identification data from one of vehicles 101, the vehicle 101 is registered in the control server apparatus 130 as a vehicle which will travel automatically on the basis of the identification data of the vehicle 101 (step S31).

The system control unit 135 then computes a route for traveling of the vehicle 101 in the automatic traveling section, including a point at which the vehicle 101 enters the automatic traveling section, a point at which the vehicle exits from the automatic traveling section, a confluence point, and divergence point, and stores these sorts of data in the database 133 along with the identification data of the vehicle 101 (route setting in the automatic traveling section (step S32)).

Subsequently, the system control unit 135 transmits data indicating that a registration of a route in the automatic traveling section has been completed (hereinafter referred to as section setting confirmation data) to the navigation apparatus 110 through the wireless communication unit 131, and then waits for arrival of the vehicle 101 at the automatic traveling section (step S33).

Subsequently, processing described below is performed in the navigation apparatus 110.

First, the system control unit 119 makes a determination as to whether the section setting confirmation data transmitted from the control server apparatus 130 is received within a time period set in advance (step S15). If the section setting confirmation data is received within the time period set in advance, the system control unit 119 waits for arrival of the vehicle 101 at the automatic traveling route (step S16).

If the section setting confirmation data is not received within the time period set in advance, the system control unit 119 determines that registration processing has ended in failure, and stops the registration operation. However, the identification data and route data may be repeatedly transmitted a certain number of times more than once for registration.

Subsequently, the system control unit 119 makes a determination in repeated cycles as to whether the vehicle 101 has reached the entry point in the automatic traveling section (step S17). When the system control unit 119 determines that the vehicle 101 has reached the automatic traveling section, it establishes a communication line to the control server apparatus 130 by the communication unit 120, transmits data indicating that the vehicle has reached the automatic traveling section, that is, a request for starting processing for automatic traveling (hereinafter referred to as "automatic traveling start request data") together with the identification data of the vehicle 101, and waits for reception of automatic traveling start confirmation data (step S18).

More specifically, the system control unit 119 makes a determination as to whether the vehicle 101 has reached the point according to the stored data at which the vehicle enters the automatic traveling section on the basis of the data on the entry point in the automatic traveling section obtained by the route search and stored in the navigation apparatus 110 and the position data of the vehicle 101 obtained from the wireless communication unit 131.

The arrangement may be such that identification check terminals (not shown) capable of obtaining vehicle data are placed at points at which entrance of vehicles 101 is possible, and arrival of vehicle 101 at each entry point is recognized when the identification check terminal detects the vehicle 101 registered in the control sever apparatus 130 set in advance as a vehicle which will travel automatically.

Subsequently, processing described below is performed in the control server apparatus 130.

The system control unit 135 first makes a determination in repeated cycles as to whether the automatic traveling start request data and identification data transmitted from the navigation apparatus 110 have been received (step S34). If the automatic traveling start request data has been received, the system control unit 135 starts automatic traveling control and transmits automatic traveling start confirmation data to the navigation apparatus 110 (step S35).

If the system control unit 135 determines that the vehicle 101 is not registered in the automatic traveling section, it transmits a request for manual registration of the vehicle 101 to the navigation apparatus 110 (hereinafter referred to as "manual registration request data") (step S36) and terminates the operation.

Finally, in the navigation apparatus 110, the system control unit 119 makes a determination as to whether the automatic traveling start confirmation data or manual registration request data has been received within a time period set in advance. When the automatic traveling start confirmation data is received, the system control unit 119 performs control for making the automatic traveling apparatus (not shown) start automatic traveling, thereby starting automatic traveling (step S20). However, this control is started on condition that the arrival of the vehicle 101 at the entry point is detected by the identification check terminal for recognizing each vehicle 101 at the entry point in the automatic traveling route.

If the automatic traveling start confirmation data is not received within the time period set in advance, or if the manual registration request data is not received, the system control unit 119 determines that registration processing has ended in failure and terminates the registration operation.

In this case, the system control unit 119 displays a predetermined notice on the display unit 117 or the like to request the user to register the vehicle 101 and to set an exit point etc. in the automatic travel control.

(2) Operations in Cancellation Processing in the Present Embodiment

Subsequently, the operations in cancellation processing in this embodiment will be described with reference to FIG. 5 and FIG. 6.

Figure 6A:
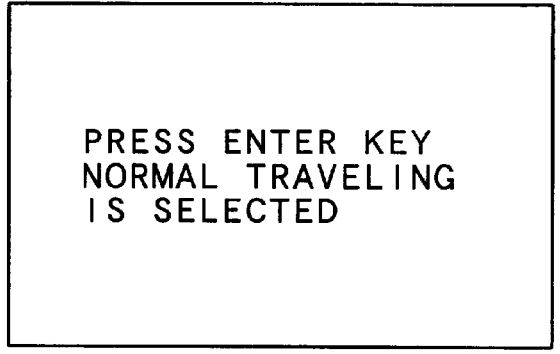
FIGS. 6A, 6B, and 6C are diagrams each showing an example of a changeover notice displayed on a display unit at the time of changeover from automatic traveling to normal-drive traveling in the embodiment of the present invention.
Figure 6B:
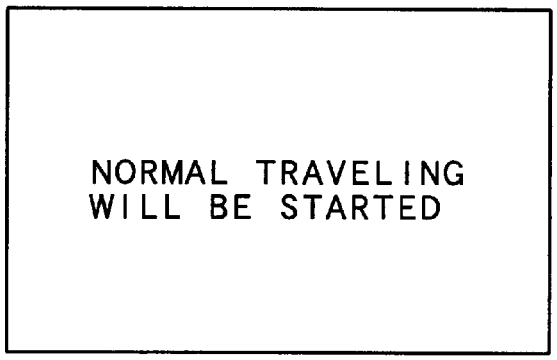
Figure 6C:
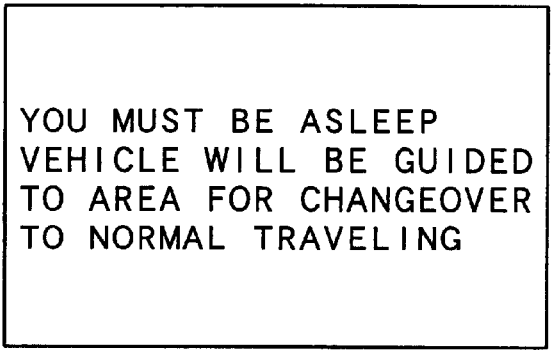

FIG. 5 is a flowchart showing the operations of the navigation apparatus 110 and the control server apparatus 130 when cancellation processing is performed. FIGS. 6A, 6B, and 6C are diagrams showing examples of a changeover notice displayed on the display unit 117. The operations will be described by assuming that the vehicle 101 has reached an exit point in the automatic traveling section.

When the system control unit 135 in the control server apparatus 130 recognizes that the vehicle 101 has reached an exit point in the automatic traveling section based on a notice transmitted from the navigation apparatus 110 or by a predetermined method, e.g., detection by the identification check terminal (not shown) (step S51), it transmits data indicating that the vehicle has reached the exit point (hereinafter referred to as "exit confirmation data") to the navigation apparatus 110 and waits for receiving of changeover confirmation data or changeover non-confirmation data described below (step S52).

Subsequently, processing described below is performed in the navigation apparatus 110.

When the system control unit 119 receives the exit confirmation data (step S41), it provides a notice for requesting the driver to operate a certain device for switching from automatic traveling to manual traveling (i.e., normal-drive traveling) (step S42). For example, visual data such as shown in FIG. 6A is displayed on the display unit 117, or a speech notice is output from the speech guidance unit 118.

Subsequently, the system control unit 119 then makes a determination as to whether changeover to normal-drive traveling has been done within a time period set in advance (step S43). If the changeover has been done, the system control unit 119 displays data such as shown in FIG. 6B on the display unit 117, and transmits data indicating that the changeover has been completed (hereinafter referred to as "changeover confirmation data") to the control server apparatus 130 through the communication unit 120 (step S44).

On the other hand, if the system control unit 119 determines that changeover to normal-drive traveling has not been done within the time period set in advance, it transmits changeover non-confirmation data indicating that the changeover has not been done to the control server unit 130 through the communication unit 120 (step S45).

In this embodiment, the switching of the traveling mode is performed on the basis of bodily data obtained by the traveling mode changeover unit (not shown). In association with the operation of this unit, visual data such as shown in FIG. 6C is displayed on the display unit 117 by the system control unit 119.

Subsequently, in the control server apparatus 130, the system control unit 135 makes a determination as to whether the changeover confirmation data or changeover non-confirmation data has been received (step S53). If the changeover confirmation data has been received, the system control unit 135 cancels the registration of the vehicle, gives exit permission (step S54), and terminates the operation.

The vehicle 101 permitted to exit can perform normal-drive traveling. Therefore it exits from the automatic traveling section into a non-automatic traveling section and starts normal-drive traveling.

In the case where the system control unit 135 in the control server unit 130 has received changeover non-confirmation data, it determines that the driver is in such a condition that he or she cannot drive the vehicle 101, and controls each unit so that the vehicle 101 is made to turn aside out of the travel path into a parking area or the like (step S55), and terminates the operation.

(3) Reregistration operations in Re-search Processing during Automatic Traveling in the Present Embodiment Reregistration operations in re-search processing during automatic traveling in this embodiment will be described with reference to FIG. 7.

Figure 7:
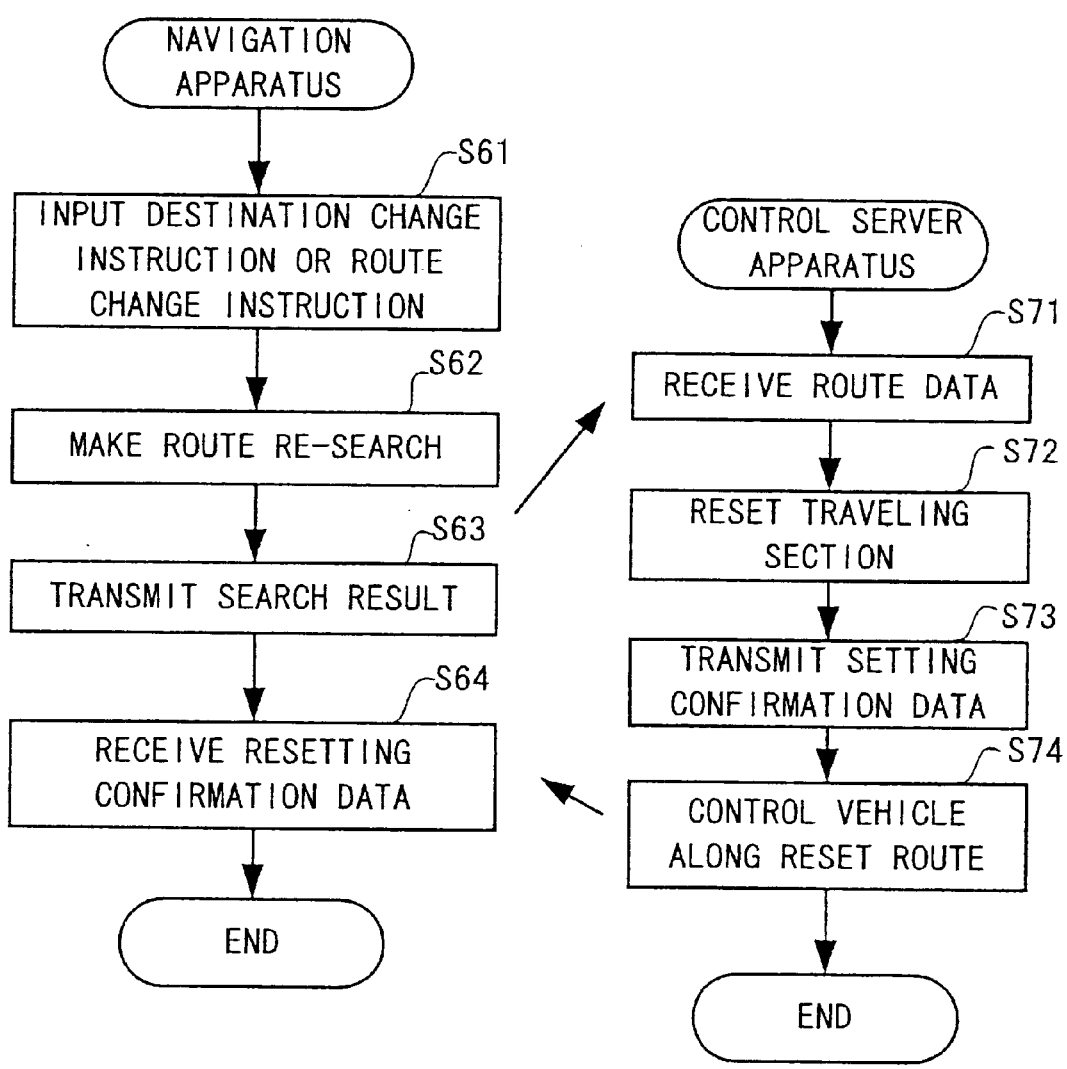
FIG. 7 is a flowchart showing operations of the navigation apparatus and the control server apparatus in reregistration processing in the embodiment of the present invention.

FIG. 7 is a flowchart showing the operations of the navigation apparatus 110 and the control server apparatus 130 in re-search processing. The vehicle 101 is assumed to be traveling in the automatic traveling section in an automatic traveling manner.

In the navigation apparatus 110, when an instruction to change the destination is provided through the operating unit 116 by a user, e.g., a driver (step S61), or when a route change is designated on the basis of traffic data such as congestion data obtained by the VICS data receiving unit 114 (step S61), the system control unit 119 makes a re-search for a new route to the destination (step S62), and transmits route data as a result of this re-search and the identification data to the control server apparatus 130 through the communication unit 120 (step S63).

Subsequently, processing described below is performed in the control server apparatus 130.

When the route data transmitted from the navigation apparatus 110 is received (step S71), the system control unit 135 again computes a route for traveling of the vehicle 101 in the automatic traveling section, including a point at which the vehicle 101 exits from the automatic traveling section, a confluence point, and divergence point, and stores these sorts of data in the database 133 along with the identification data of the vehicle 101 ((step S72) route resetting in the automatic traveling section).

The system control unit 135 then transmits data indicating that a reregistration of a route in the automatic traveling section has been completed (hereinafter referred to as "resetting confirmation data") to the navigation apparatus 110 through the wireless communication unit 131 (step S73) and starts controlling automatic traveling of the vehicle, 101 (step S74) on the basis of the reset route.

Finally, the system control unit 119 in the navigation apparatus 110 receives the resetting confirmation data, displays data indicating that resetting has been completed on the display unit 117 or the like, and terminates the operation (step S64).

According to this embodiment, in the case where at least part of an automatic traveling section is selected to be used as a traveling route as a result of a search for a traveling route to a destination which is to be reached by a vehicle 101, the navigation apparatus 110 registers the automatic traveling path to be used in the control server apparatus 130, and the control server apparatus 130 controls automatic traveling of the vehicle 101 along the automatic traveling path when the vehicle 101 travels in the automatic traveling section, thus performing automatic guidance of the vehicle.

Thus, in the case where at least part of the automatic traveling section is included in the traveling route for the vehicle 101, the automatic traveling route for automatic traveling of the vehicle 101 can be registered without any troublesome operation at the time of entry into the automatic traveling section or exit from the automatic traveling section. In this manner, the operability for the user can be improved and improved user support can be ensured.

Since the result of a route search made by the navigation apparatus 110 is used at the time of setting of a route in the automatic traveling section through which the vehicle 101 travels automatically, the automatic traveling path can be registered with reliability.

When the user makes a re-search for a new traveling route to the destination while the vehicle is traveling in the automatic traveling section, an automatic traveling path can be reregistered on the basis of the traveling route to the destination obtained by the re-search. Thus, an automatic traveling path can be reregistered on the basis of a re-search result. Therefore, even if the section through which automatic traveling is performed is changed, for example, by changing the automatic traveling section exit point as a re-search result, a change in registration can be easily made.

Also, at least one of vehicle identification data, an entry point at which the vehicle enters the automatic traveling section, and an exit point at which the vehicle exits from the automatic traveling section can be registered as well as the automatic traveling section through which the vehicle 101 travels. Therefore entry into the automatic traveling section and exit from the automatic traveling section can be controlled with reliability. Since each vehicle 101 can be easily identified based on the identification data, automatic traveling control can be correctly performed with respect to each vehicle 101, thus enabling management on the automatic traveling section to be performed smoothly.

When switching of the traveling mode from automatic traveling to normal-drive traveling or from normal-drive traveling to automatic traveling at an entry point or an exit point in the automatic traveling section is detected, starting and termination of automatic traveling of the vehicle can be controlled. Therefore, if switching of the traveling mode is detected when the vehicle 101 enters the automatic traveling section or exits from the automatic traveling section, automatic traveling can be started or terminated. If the traveling mode is not switched to normal-drive traveling after the completion of traveling through the automatic traveling section, the vehicle is not allowed to enter a normal-drive traveling path but made to turn aside into a parking area or the like. Thus, safety of the vehicle traveling in both automatic and non-automatic traveling sections can be ensured without requiring any troublesome operation.

Figure 9:
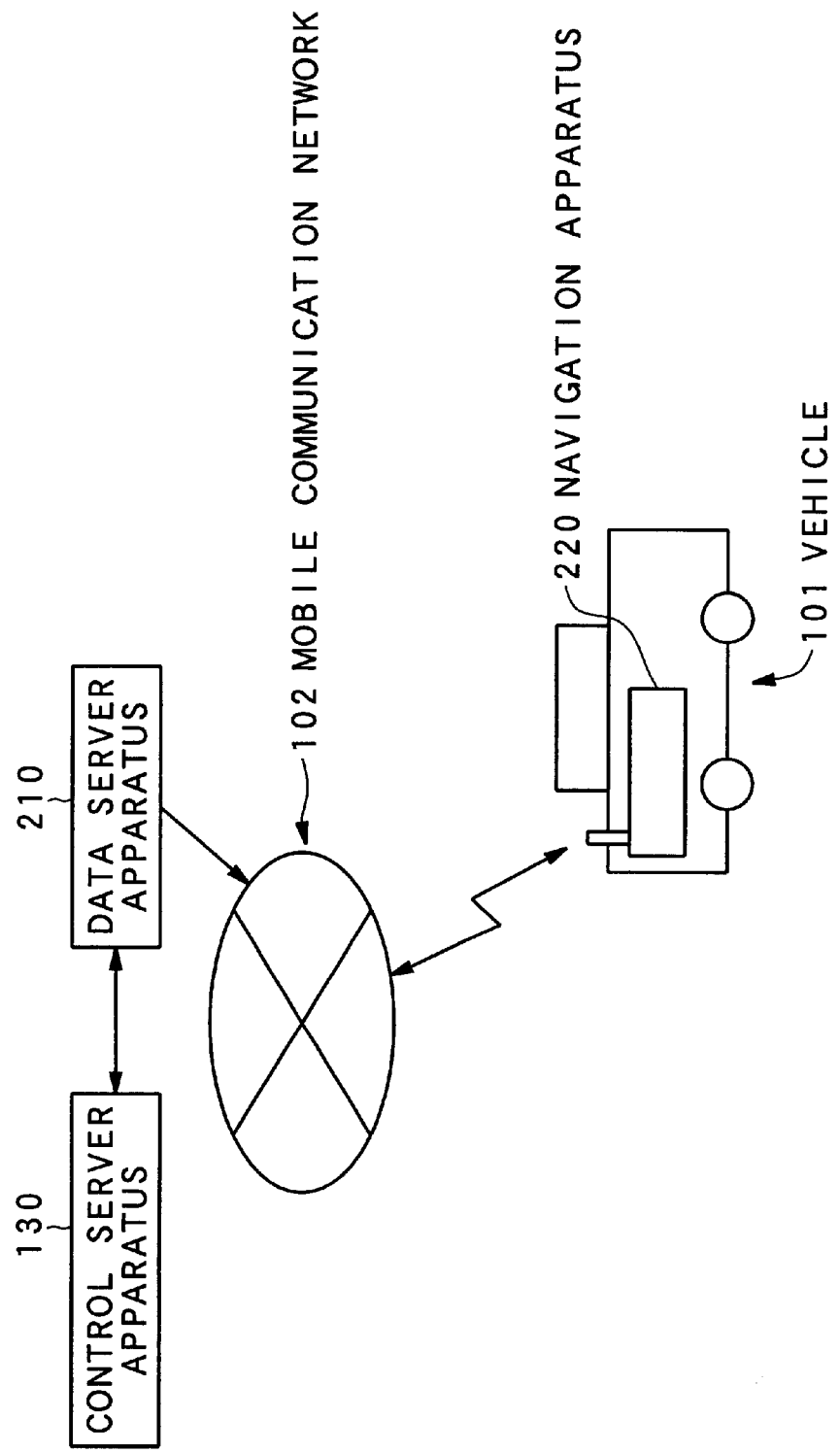
FIG. 9 is a diagram schematically showing another automatic guidance system configuration in accordance with the present invention.

A conventional automatic operation control apparatus 10 shown in FIG. 9 is comprised a position detecting device 11 for detecting the position of a traveling vehicle, an operation mode changeover and notifying device 12 which effects changeover between an automatic driving mode and a normal driving mode (in which normal-drive traveling controlled by a driver is performed), an automatic driving controller 13 which controls driving of the vehicle, an actuator 14 which controls the traveling speed of the vehicle and the steering angle, and a detection device 15 which detects a steering operation performed by the driver at the time of changeover of the traveling mode from the automatic-drive traveling mode to the normal-drive traveling mode.

This conventional automatic operation control apparatus 10 is arranged to control traveling of the vehicle on the basis of the result of detection performed by the detection device 15. When the steering operation is detected at the time of changeover from automatic-drive traveling to normal-drive traveling, it is recognized that the driver is preparing for manual driving. That is, this result of detection of the steering operation indicates that the steering operation for steering the vehicle to the target road is being performed. In this situation, therefore, automatic driving control is not required and the operation mode can be changed from automatic-drive traveling to normal-drive traveling.

The conventional automatic operation control apparatus 10, however, requires a driver's operation for changing the vehicle traveling mode from the automatic-drive traveling mode to the normal-drive traveling mode during automatic-drive traveling. If the driver misses a point at which changeover from automatic-drive traveling to normal-drive traveling should be made, there is a possibility that the vehicle cannot travel the route on which the vehicle should travel.

Also, it is thought that in the case where a driver previously sets points at which the vehicle traveling mode should be changed from automatic-drive traveling to normal-drive traveling, troublesome operations for setting of an exit point etc. are required.

Consequently, the conventional automatic operation control apparatus is not capable of easily registering an automatic traveling section in comparison with this embodiment of the present invention.

In this embodiment, a vehicle in an automatic traveling section is guided from a point at which the vehicle enters the automatic traveling section to a point at which the vehicle exits from the automatic traveling section on the basis of the result of a route search made by the navigation apparatus. However, when the vehicle arrives at a point in the vicinity of the exit point, that is, when the state of the vehicle traveling a predetermined distance before the exit point is detected, the user may be notified that the vehicle is approaching the exit point to get ready for switching of the traveling mode.

In this case, there is no need to guide the vehicle at the time of exit from the automatic traveling section into a non-automatic traveling section. Therefore the cost of provision of facilities etc. can be reduced. Also, this arrangement is effective in the case where vehicle guidance at the time of exit from an automatic traveling section is difficult. Thus, automatic traveling can be easily realized.

In this embodiment, route search conditions may be input at the time of route searching. For example, a selection as to whether the proportion of an automatic traveling section in a route to a destination is comparatively large or not may be made, the setting of the time period for traveling in an automatic traveling section may be adjusted, and a route setting may be made in such a manner that no automatic traveling section is included in a route. In such a case, the navigation apparatus makes a route search under such conditions.

In this embodiment, a route search for a vehicle is performed by the navigation apparatus mounted on the vehicle, and a registration of the vehicle with respect to an automatic traveling section and cancellation of the registration are made by performing communication with the control server apparatus. However, the arrangement may alternatively be such that an data server apparatus is fixedly installed in a place freely selected; a communication terminal device is mounted on a vehicle; communication is performed between the data server apparatus and the communication terminal device to enable navigation of the vehicle; and identification data and route data of the vehicle are transmitted to a control server apparatus.

Figure 8:
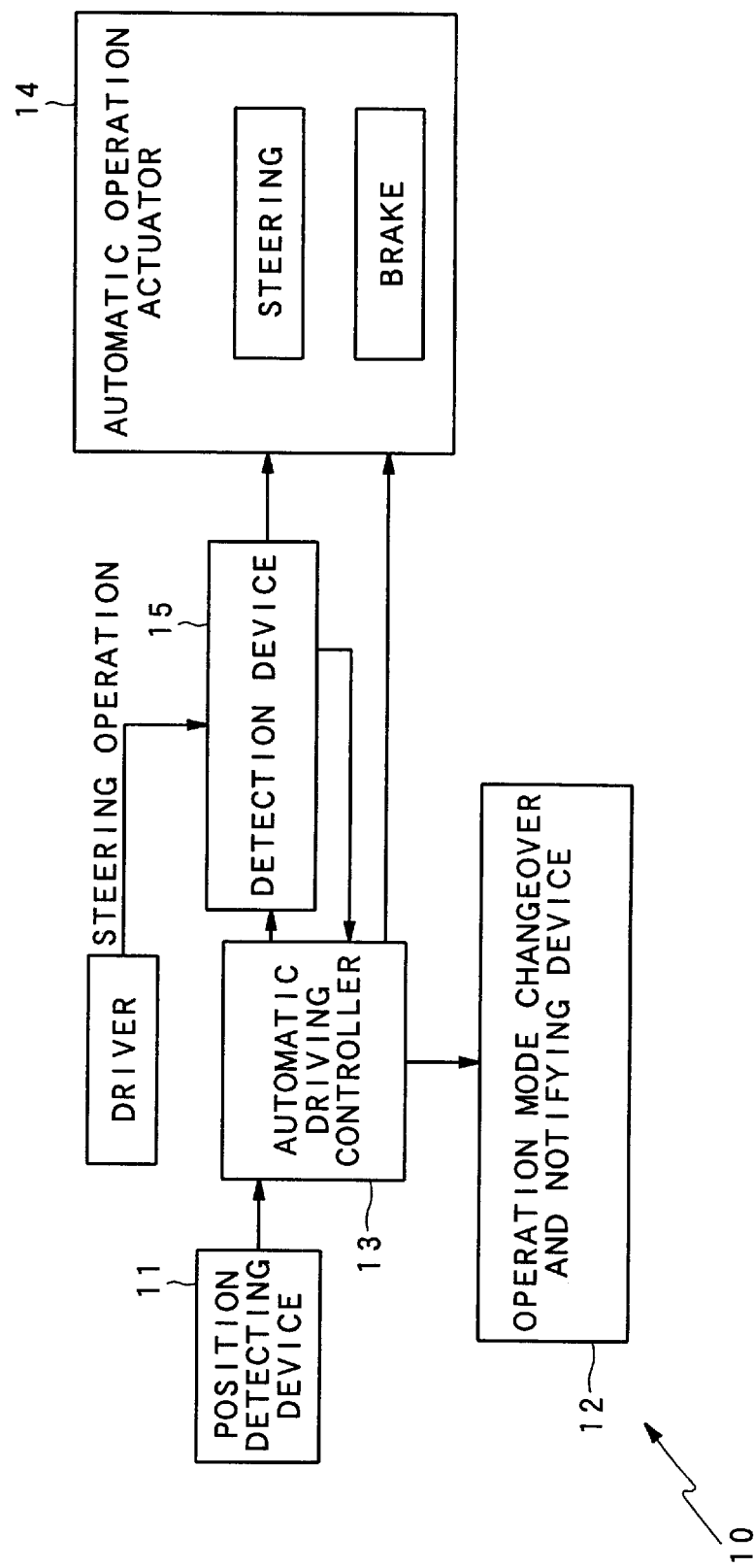
FIG. 8 is a block diagram showing a configuration of a conventional automatic operation control apparatus.

In such a case, an automatic guidance system 200 is comprised, as shown in FIG. 8, an data server apparatus 210, a communication terminal device 220 which communicates with the data server apparatus 210 through a mobile communication network 102, and a control server apparatus 130. The control server apparatus 130 communicates with the data server apparatus 210 through a communication line such as a public telephone network line. The communication terminal device 220 obtains position data and destination data for traveling of a vehicle 101 on which the communication terminal device 220 is mounted, and transmits the data to the data server apparatus 210. The data server apparatus 210 receives route data and identification data obtained by the communication terminal device, performs route search processing, and transmits necessary data to the control server apparatus 130.

In this embodiment, the automatic guidance system is comprised the control server apparatus and the navigation apparatus or the control server apparatus, the data server apparatus and the communication terminal device. One of them is comprised by the above-described components. Each of the system control units 119 and 135 in the navigation apparatus and the data server apparatus or in the data server apparatus, the communication terminal device and the control server apparatus may be provided with a computer and a recording medium such as a hard disk. Programs for performing the above-described processings corresponding to the units of the data server apparatus and the navigation apparatus or the data server apparatus, the control server apparatus, and the communication terminal device may be stored on the recording mediums, and the programs may be read to the computers to enable the computers to respectively operate the data server apparatus and the navigation apparatus or the data server apparatus, the communication terminal device and the control server apparatus.

In this case, each of the system control units 119 and 135 in the data server apparatus and the navigation apparatus or the data server apparatus, the communication terminal device and the control server apparatus is connected to the control units of the other apparatus. Each of their computers which is operated in a linked relationship performs one of the above-described registration processing, cancellation processing and reregistration processing. In this case, each of the system control units 119 and 135 is served as one of the registration device, acquisition device, route search device, re-search device, changeover data acquisition device, receiving device, route data acquisition device, and automatic guidance device in accordance with the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-337629 filed on Nov. 2, 2001 including the specification, claims, drawings and summary is incorporated herein by reference in its entirety.

What is claimed is:

1. An automatic vehicle guidance system for guiding a vehicle which travels in an automatic traveling manner without being operated by a driver in an automatic traveling section which is an automatic traveling path, said automatic vehicle guidance system comprising:
    a control device for managing said automatic traveling section, and controlling the vehicle traveling in said automatic traveling section;
    an acquisition device for obtaining present position data indicating the present position of the vehicle, and destination data indicating a destination to be reached by the vehicle;
    a route search device for making a search for a travel route to the destination on the basis of the present position data and the destination data relating to the vehicle; and
    a registration device for registering said automatic traveling path which is included in the travel route if at least part of said automatic traveling section is included in the travel route as a result of the route search,
    wherein said control device controls automatic traveling of the vehicle along the registered automatic traveling path to perform automatic guidance of the vehicle.

2. The automatic vehicle guidance system according to claim 1, further comprising:
    a re-search device for making at least a re-search for a travel route for the vehicle on the basis of the destination data while the vehicle is traveling in said automatic traveling section,
    wherein if a travel route to the destination is set by the re-search while the vehicle is traveling in said automatic traveling section, said registration device reregisters said automatic traveling path on the basis of the travel route set by the re-search.

3. The automatic vehicle guidance system according to claim 1, wherein:
    when said registration device registers said automatic traveling path, it registers at least one of the identification data of the vehicle, entry point data indicating an entry point at which the vehicle enters said automatic traveling section, and exit point data indicating an exit point at which the vehicle exits from said automatic traveling section.

4. The automatic vehicle guidance system according to claim 3, in a case where at least one of the entry point data and the exit point data is registered by said registration device, further comprising:
    a receiving device for receiving arrival data indicating that the vehicle reaches at least one of the entry point and the exit point,
    wherein said control device controls at least one of starting and termination of automatic traveling of the vehicle on the basis of the arrival data.

5. The automatic vehicle guidance system according to claim 3, in a case where at least one of the entry point data and the exit point data is registered by said registration device, further comprising:
    a detection device for detecting at least one of changeover of the traveling mode from the automatic traveling to normal-drive traveling based on manual operations, and changeover of the traveling mode from the normal-drive traveling to the automatic traveling,
    wherein said control device controls at least one of starting and termination of automatic traveling of the vehicle when said detection device detects at least one of changeover of the traveling mode at the entry point, and changeover of the traveling mode at the exit point.

6. The automatic vehicle guidance system according to claim 5, wherein:
    said detection device detects changeover of the traveling mode based on condition data of the driver who is operating the vehicle.

7. The automatic vehicle guidance system according to claim 6, wherein:
    the condition data has bodily data indicating condition which is included at least one of an awake condition and an asleep condition of driver, and said detection device detects changeover of the traveling mode based on the bodily data.

8. The automatic vehicle guidance system according to claim 1, wherein:
    said automatic traveling path registered by said registration device is previously registered before the vehicle enters said automatic traveling section.

9. The automatic vehicle guidance system according to claim 1, further comprising:
    a navigation system for performing navigation of the vehicle,
    wherein said navigation system is provided with said acquisition device and said route search device, and
    said registration device registers said automatic traveling path, which is included in the travel route as a result of the route search, by communicating with said navigation system.

10. The automatic vehicle guidance system according to claim 9, wherein:
    said navigation system comprises an data server device fixedly installed, and a communication terminal device mounted on the vehicle and communicating with said data server device through a mobile communication network,
    said communication terminal device and said data server device communicate with each other to perform navigation of the vehicle, said data server device and said registration device communicate with each other to register said automatic traveling path which is included in the travel route as a result of the route search, and said control device performs automatic guidance of the vehicle traveling in said automatic traveling section.

11. A control apparatus for an automatic vehicle guidance system for guiding a vehicle, which travels in an automatic traveling manner without being operated by a driver in an automatic traveling section which is an automatic traveling path, said control apparatus comprising:

a control device for managing said automatic traveling section and controlling the vehicle traveling in said automatic traveling section;

a route data acquisition device for obtaining route data indicating a travel route to destination to be reached by the vehicle as a result of route search based on present position data of the vehicle, and destination data indicating a destination to be reached by the vehicle; and a registration device for registering said automatic traveling path which is included in the travel route if at least part of said automatic traveling section is included in the travel route as a result of the route search, wherein said control device controls automatic traveling of the vehicle along the registered automatic traveling path to perform automatic guidance of the vehicle.

12. The control apparatus according to claim 11, wherein:

if a travel route to the destination is set by the re-search while the vehicle is traveling in said automatic traveling section, said registration device reregisters said automatic traveling path on the basis of the travel route set by the re-search.

13. The control apparatus according to claim 11, wherein:

when said registration device registers said automatic traveling path, it registers at least one of the identification data of the vehicle, entry point data indicating an entry point at which the vehicle enters said automatic traveling section, and exit point data indicating an exit point at which the vehicle exits from said automatic traveling section.

14. The control apparatus according to claim 13, in a case where at least one of the entry point data and the exit point data is registered by said registration device, further comprising:

a receiving device for receiving arrival data indicating that the vehicle reaches at least one of the entry point and the exit point, wherein said control device controls at least one of starting and termination of automatic traveling of the vehicle on the basis of the arrival data.

15. The control apparatus according to claim 13, in a case where at least one of the entry point data and the exit point data is registered by said registration device, further comprising:

a changeover data acquisition device obtains changeover data which includes at least one of data indicating changeover of the traveling mode from the automatic traveling to normal-drive traveling based on manual operations in the vehicle, and data indicating changeover of the traveling mode from the normal-drive traveling to the automatic traveling in the vehicle, wherein said control device controls at least one of starting and termination of automatic traveling of the vehicle when said changeover data acquisition device obtains the changeover data.

16. The automatic vehicle guidance system according to claim 11, wherein:

said registration device registers said automatic traveling path previously before the vehicle enters said automatic traveling section.

17. An automatic vehicle guidance method in which automatic guidance of a vehicle is performed by controlling traveling of the vehicle in an automatic traveling section which is a travel path on which the vehicle travels in an automatic traveling manner without being operated by a driver, comprising:

an acquisition process of obtaining present position data indicating the present position of the vehicle, and destination data indicating a destination to be reached by the vehicle;

a route search process of making a search for a travel route to the destination on the basis of the present position data and the destination data relating to the vehicle;

a registration process of registering said automatic traveling path which is included in the travel route if at least part of said automatic traveling section is included in the travel route as a result of the route search; and an automatic guidance process of controlling automatic traveling of the vehicle along the registered automatic traveling path to perform automatic guidance of the vehicle.

18. The automatic vehicle guidance method according to claim 17, further comprising:

a re-search process of making at least a re-search for a travel route for the vehicle on the basis of the destination data while the vehicle is traveling in said automatic traveling section, wherein, in said registration process, if a travel route to the destination is set by the re-search while the vehicle is traveling in said automatic traveling section, said automatic traveling path is reregistered on the basis of the travel route set by the re-search.

19. The automatic vehicle guidance method according to claim 17, wherein:

in said registration process, when said automatic traveling path is registered, at least one of the identification data of the vehicle, entry point data indicating an entry point at which the vehicle enters said automatic traveling section, and exit point data indicating an exit point at which the vehicle exits from said automatic traveling section is registered.

20. The automatic vehicle guidance method according to claim 17, wherein:

said automatic traveling path registered in said registration process is previously registered before the vehicle enters said automatic traveling section.

21. A data recorded medium wherein an automatic vehicle guidance program is recorded so as to be read by a computer, the computer included in an automatic vehicle guidance system for guiding a vehicle which travels in an automatic traveling manner without being operated by a driver in an automatic traveling section which is an automatic traveling path, the automatic vehicle guidance program causing the computer to function as:

a control device manages said automatic traveling section and controls the vehicle traveling in said automatic traveling section;

an acquisition device obtains present position data indicating the present position of the vehicle, and destination data indicating a destination to be reached by the vehicle;

a route search device makes a search for a travel route to the destination on the basis of the present position data and the destination data relating to the vehicle; and a registration device registers said automatic traveling path which is included in the travel route if at least part of said automatic traveling section is included in the travel route as a result of the route search; and an automatic guidance device controls automatic traveling of the vehicle along the registered automatic traveling path to perform automatic guidance of the vehicle.

22. The information recorded medium according to claim 21, wherein the automatic vehicle guidance program further causes the computer to function as:

a re-search device makes at least a re-search for a travel route for the vehicle on the basis of the destination data while the vehicle is traveling in said automatic traveling section; and said registration device reregisters said automatic traveling path on the basis of a travel route to the destination set by the re-search if the travel route is set by the re-search while the vehicle is traveling in said automatic traveling section.

23. The information recorded medium according to claim 21, wherein the automatic vehicle guidance program further causes the computer to function as:

when said registration device registers said automatic traveling path, it registers at least one of the identification data of the vehicle, entry point data indicating an entry point at which the vehicle enters said automatic traveling section, and exit point data indicating an exit point at which the vehicle exits from said automatic traveling section.

24. The information recorded medium according to claim 21, wherein the automatic vehicle guidance program further causes the computer to function as:

said registration device registers the registered automatic traveling path previously before the vehicle enters said automatic traveling section.

* * * * *